(12) United States Patent
Koenig et al.

(10) Patent No.: US 8,328,481 B2
(45) Date of Patent: Dec. 11, 2012

(54) RETAINING DEVICE FOR VEHICLE INTERIORS

(75) Inventors: Andreas Koenig, Holzheim (DE); Jurgen Rittler, Ulm-Gogglingen (DE); Lutz Wolle, Neu-Ulm (DE)

(73) Assignee: Tanos GmbH Verpacken Ordnen Prasentieren, Neu-Ulm (DE)

( * ) Notice: Subject to any disclaimer, the term of this patent is extended or adjusted under 35 U.S.C. 154(b) by 154 days.

(21) Appl. No.: 12/678,582

(22) PCT Filed: Sep. 12, 2008

(86) PCT No.: PCT/EP2008/007526
§ 371 (c)(1),
(2), (4) Date: Mar. 17, 2010

(87) PCT Pub. No.: WO2009/036928
PCT Pub. Date: Mar. 26, 2009

(65) Prior Publication Data
US 2010/0215457 A1    Aug. 26, 2010

(30) Foreign Application Priority Data
Sep. 18, 2007    (DE) .......................... 10 2007 043 743

(51) Int. Cl.
*B60P 7/08* (2006.01)
(52) U.S. Cl. ........................................ 410/129; 410/151
(58) Field of Classification Search .................. 410/89, 410/129, 140, 143, 151, 153; 280/748; 211/105.3, 211/187; 224/404, 901.2, 901.8; 248/354.3, 354.6
See application file for complete search history.

(56) References Cited

U.S. PATENT DOCUMENTS

| | | | | |
|---|---|---|---|---|
| 4,986,706 | A | * | 1/1991 | Williams, Jr. ................. 410/129 |
| 5,281,063 | A | | 1/1994 | Austin, III |
| 5,320,464 | A | * | 6/1994 | Long et al. .................... 410/144 |
| 5,865,580 | A | | 2/1999 | Lawrence |
| 2002/0150439 | A1 | | 10/2002 | Lemke |
| 2002/0176759 | A1 | | 11/2002 | Kanczuzewski et al. |
| 2004/0156692 | A1 | | 8/2004 | Rhodes |

FOREIGN PATENT DOCUMENTS

| | | |
|---|---|---|
| DE | 20106403 | 7/2001 |
| DE | 10238962 | 8/2004 |
| EP | 156841 | 8/2005 |
| EP | 1721781 | 11/2006 |
| WO | 2004043742 | 5/2004 |

* cited by examiner

*Primary Examiner* — Stephen Gordon
(74) *Attorney, Agent, or Firm* — Hoffmann & Baron, LLP

(57) ABSTRACT

A retaining device which can be fitted in a vehicle interior, in particular as part of a storage system. The retaining device contains at least one retaining strut with a length-adjustable rod structure and two plate-like supporting elements attached to the end sides thereof. The supporting elements can be fixed to the vehicle walls by a respective adhesive fastening device. This results in a secure support for the retaining struts without it being necessary to brace the retaining struts fixedly between the vehicle walls.

23 Claims, 8 Drawing Sheets

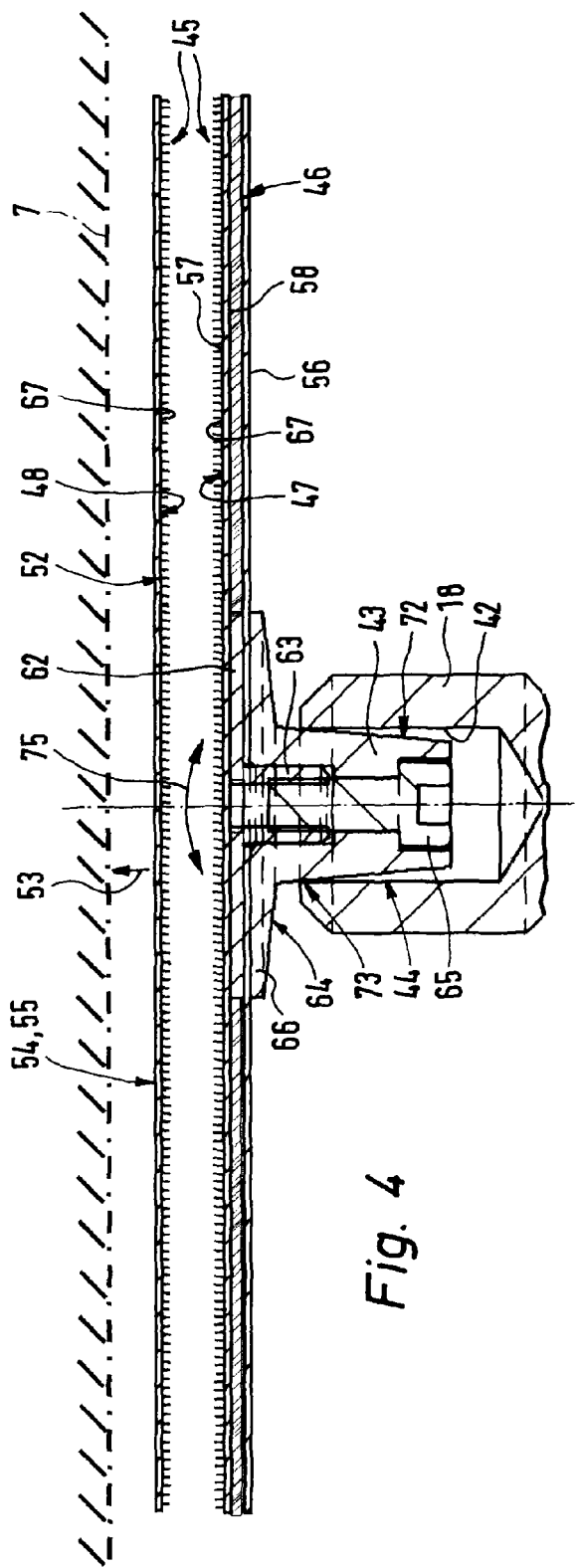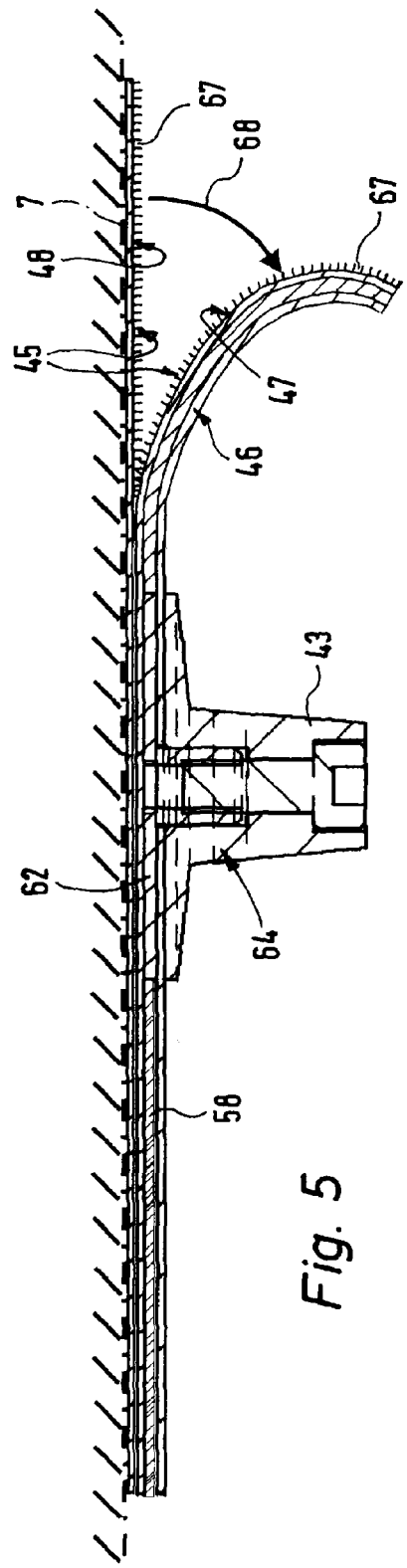
Fig. 4
Fig. 5

RETAINING DEVICE FOR VEHICLE INTERIORS

This application claims priority based on an International Application filed under the Patent Cooperation Treaty, PCT/EP2008/007526, filed Sep. 12, 2008, which claims priority to DE 102007043743.0, filed Sep. 18, 2007.

BACKGROUND OF THE INVENTION

The invention relates to a retaining device for vehicle interiors, in particular as a component of a storage system for objects to be carried in a vehicle, having at least one retaining strut, which has a longitudinally adjustable rod structure, as well as two plate-shaped support members arranged at two oppositely located front ends of the rod structure, and which can be releasably mounted in a vehicle interior in such a way that it extends between two oppositely located vehicle walls, and by means of its two support members it is supported flush on these vehicle walls.

A retaining device of this type, known from EP 1 568 541 A1, contains a plurality of retaining struts, which can be mounted in the cargo area of a motor vehicle and function as the bearing elements of a storage system for objects to be carried in the vehicle. It is for example possible to fix storage elements in place on the retaining struts, in which tools, containers or other objects can be stored. It is also possible to utilize each retaining strut by itself alone in order to secure objects to be transported in their position during their transport.

A comparable retaining device with a differently detailed structure of the retaining strut is also known from DE 102 38 962 B4.

In both the known cases the at least one retaining strut is strongly clamped between two oppositely located vehicle walls for the purpose of its own fixation in place, wherein as a rule this is the vehicle floor and the vehicle roof. The rod structure can be axially screwed apart by means of a threaded arrangement integrated into the rod structure and the required prestressingion can be built-up in this way.

However, as it has been shown, motor vehicles, in particular those of more recent model years, have only a low structural stiffness in the wall sections which are suitable for the placement of the support members. Therefore the danger arises that in the course of clamping down a retaining strut the vehicle walls are deformed, so that on the one hand the desired retention cannot be assured, and furthermore the risk of damage to the vehicle itself exists.

A rod which can be telescoped is known from US 2002/0150439 A1, and can be fixed in place on the lateral walls of a vehicle in that it is inserted into cups on the front, which are fastened by means of an adhesive or mechanical fastening element on the said lateral walls.

WO 2004/043742 A2 describes the fastening of a rod-shaped retaining element by means of carriers which can be attached to the front, which can be releasably fixed in place on side walls of a vehicle, for example by means of an adhesive tape, a hook-and-loop closure, or a plug-in connection.

Rods used for fixing a load in place are known from U.S. Pat. No. 5,281,063, which respectively can be fixed in place on a vehicle wall by interposing a retaining element. The retaining elements can be fastened by means of a hook-and-loop closure material or an adhesive.

U.S. Pat. No. 5,865,580 discloses a dividing arrangement for the load bed of a vehicle. It consists of individual T-shaped segments, which are flexibly connected with each other. The segments are provided with skid-blocking protrusions on the underside of their feet.

An adjustable device for stabilizing loads is disclosed in EP 1 721 781 A2. It contains two rod elements, which can be telescoped and have support plates at the front. The support plates can adhere to the loads to be stabilized by means of adhesive elements.

SUMMARY OF THE INVENTION

It is an object of the instant invention to create a retaining device of the type mentioned at the outset, which can be installed in a dependable manner in a vehicle interior without any danger to the vehicle walls.

To attain this object, an adhesive closure device, having adhesive closure faces which can be releasably connected with each other, is assigned to one or both support members of the retaining strut for the releasable fastening on the respectively assigned vehicle wall.

In principle it would be possible to embody the adhesive closure faces which cooperate with each other as self-adhesive surfaces. However, an embodiment of the adhesive closure device in the form of a hook-and-loop closure arrangement is considered to be particularly advantageous, in which the adhesive closure faces have adhesive structures which are releasably hooked together. In contrast to purely adhesive closure devices, hook-and-loop devices have the advantage that for all practical purposes they can be re-used as often as needed, without the adhesive force being reduced and without the adhesive closure faces becoming soiled.

Regardless of the actual type of realization, the fixation in place of the support members on the sides of the vehicle by means of adhesive closure devices has the advantage that the rod structure can absorb large lateral forces without a particular prestressingion being built up between the retaining struts and the vehicle walls. Thus, a retaining strut can also be dependably fixed in place even if the support members are not pressed against the vehicle walls with any particular prestressingion. Even without particular prestressing, the adhesive closure device prevents the retention, secure against slipping, of a support member on the vehicle wall and provides the required stability. It is thus possible to equip those vehicle interiors with one or several retaining struts, whose vehicle walls do not have any distinctive structural stiffness in respect to pressure-exerting stresses.

If a retaining strut, which extends between the vehicle floor and the vehicle roof, is installed, it might be possible to fix the support member in place on the floor in a different way than by means of an adhesive closure device. Vehicle interiors often have retaining structures which are anchored on the floor already at the factory, which can then be used for the fixation in place, secure against slippage, of the lower support member. However, the retaining device can be employed considerably more universally and independently of the vehicle type, if both support members of a retaining strut are embodied to be fixed in place by means of an adhesive closure device.

Advantageous further developments of the invention ensue from the dependent claims.

The adhesive closure device usefully has a first adhesive closure face arranged on the support member on the side facing away from the rod structure, as well as a second adhesive closure face cooperating with it which, in the state of use, is attached to the associated vehicle wall. Theoretically it would be possible to design the vehicle wall already in the factory in such a way that its interior surface would be at least partially suitable for forming an adhesive closure device, for example by equipping it with a velour covering which, when used, would permit the realization of a hook-and-loop closure arrangement. However, in order to be universally usable, the retaining device usefully includes at least one preferably flexible adhesive closure mat to constitute the second adhesive closure face, which can also be fixed in place in a releasable manner on a vehicle wall at a later time.

In particular, the adhesive closure mat can be provided with a self-adhesive layer on its reverse side, which allows variable gluing to a vehicle wall. If it is of sufficient size, a single adhesive closure mat per support member can be employed, however, there is also a possibility of realizing the second adhesive closure face by means of several smaller adhesive closure mats arranged next to each other.

The flexibility of the adhesive closure mat assures an optimal matching to uneven wall contours of the vehicle wall. While forming a dependable connection, the adhesive closure mat can cling to the inner surface of the vehicle wall.

The support member preferably has a fastening plate, which is responsible for the generally plate-like structure and has the first adhesive closure face on the side facing away from the rod structure. It usefully has flexional bending properties, so that, in case of a required removal of a retaining strut, the adhesive connection can be easily released by pulling the fastening plate, including the first adhesive closure face, off the second adhesive closure face by bending and pulling.

It applies to both adhesive closure faces that the exterior contours are in principle of arbitrary shape, but that rectangular or circular contours would mainly be recommended. In any case it is advantageous if the connecting area between the rod structure and a support member is located in the center of the support member, so that transverse forces attacking from any direction can be dependably absorbed.

In the area arranged in the axial extension of the rod structure, the fastening plate is usefully provided with a rigid support plate, which is usefully embedded in the fastening plate, for which purpose the fastening plate can have a multi-layered structure. The support plate can in particular be used for defining a mechanical interface device, by the use of which the support member can be connected in a releasable manner with the rod structure. To this end, the mechanical interface device usefully has an insertion neck projecting away from the support plate, which can be releasably introduced in the axial direction into a front plug-in receptacle of the rod structure. Usefully, the insertion neck is supported on the support plate and can be screwed together with it.

So that the transverse forces introduced by the rod structure into the support member are located as closely as possible to the support plate, and as a result it is hardly possible to introduce moments of tilt, which possibly could have the result of the coming apart of the adhesive closure faces on both sides, the insertion neck preferably has a conical exterior surface, which tapers in the direction towards its free end, and the cross section of the plug-in receptacle is matched to it in such a way that the contact area is limited to a very narrow area in the shape of a circular line at the mouth of the plug-in receptacle located close to the fastening plate. It is possible in this way to displace the force-introduction area, at which the rod structure can introduce transverse forces into the plug-in receptacle, and therefore into the support member, into the immediate vicinity of the fastening plate.

The working together of the conical insertion neck and the plug-in receptacle—the latter is in particular designed to be circular-cylindrical—also makes possible a certain limited tilting movement between the support member and the rod structure, so that these two parts can angularly align themselves with each other in case an exact right-angled alignment is not possible because of local conditions.

The longitudinal adjustability of the rod structure makes possible the easy matching of the length of the retaining strut to the distance between oppositely located vehicle walls and makes dismantling easier, once the retaining strut is no longer required.

If there is a releasable connection in particular between the support member and the rod structure, there is also the possibility of removing the rod structure during times it is not used and to leave one or both support members in place.

Furthermore, there is also the possibility of removing the retaining strut in its entirety, but to leave the adhesive closure faces arranged on the sides of the vehicle in place until they are needed again. So that these adhesive closure faces are not damaged during the time they are not in use, they can be covered, in which case the covering means are also usefully applied by complementary adhesive closure faces.

For example, the adjustability of the length of the rod structure can be realized by providing a main rod, bridging the largest portion of the distance existing between oppositely located vehicle walls, and a length-adapting element, which is in engagement with it and is axially adjustable. The length-adapting element can be embodied as a screwable element or as a slidable element. It is possible to make main rods of different structural height available for variable applications, which can be employed as needed and can be equipped with standardized length-adapting elements. It is also possible to realize main rods of different lengths by combining several rod elements.

BRIEF DESCRIPTION OF THE DRAWINGS

The invention will be explained in greater detail in what follows by means of the attached drawings. Shown in them are in FIG. 1, a storage system realized with the use of two retaining struts of a preferred structure in accordance with the invention in a state in which it is mounted in the vehicle interior, wherein two vehicle walls, which work together with the retaining struts, are indicated by dash-dotted lines, FIG. 2, an individual representation of one of the retaining struts used in FIG. 1 in the state in which it is mounted between two vehicle walls which are indicated in dash-dotted lines, FIG. 3, the section III marked by dash-dotted lines in FIG. 2 in an enlarged representation in longitudinal section, FIG. 4, the upper end section of the arrangement visible in FIG. 3 with the separate adhesive closure device, and with the adhesive closure face not yet mounted on the vehicle wall, FIG. 5, the upper end section of the arrangement visible in FIG. 3 during the phase of removing a support member by removing the adhesive closure device, FIG. 6, the arrangement in FIG. 3 in a perspective exploded view, FIG. 7, the area marked in dash-dotted lines in FIG. 2 in an enlarged view in longitudinal section, FIG. 8, the upper end section of a modified structure of the retaining strut in a mounted state comparable with FIG. 4, and FIG. 9, the arrangement in FIG. 8 in a perspective exploded view.

DETAILED DESCRIPTION OF THE PREFERRED EMBODIMENTS

Figure 1:
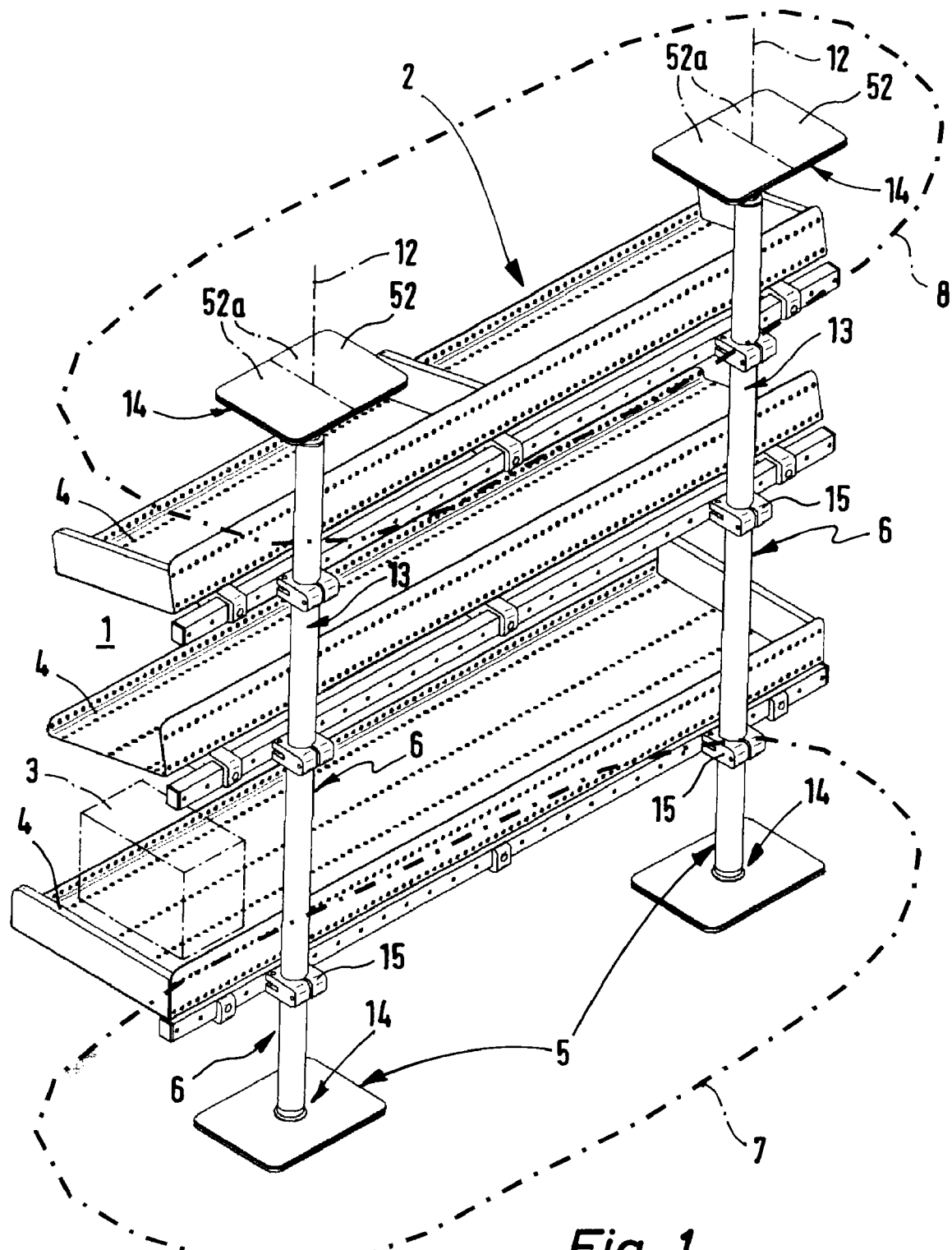
Figure 2:
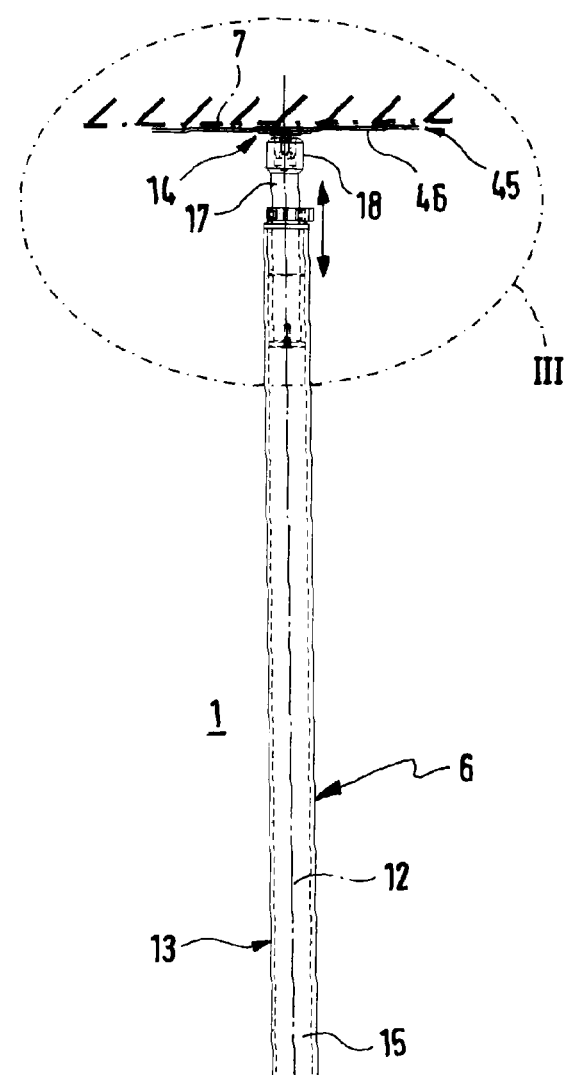
Figure 2:
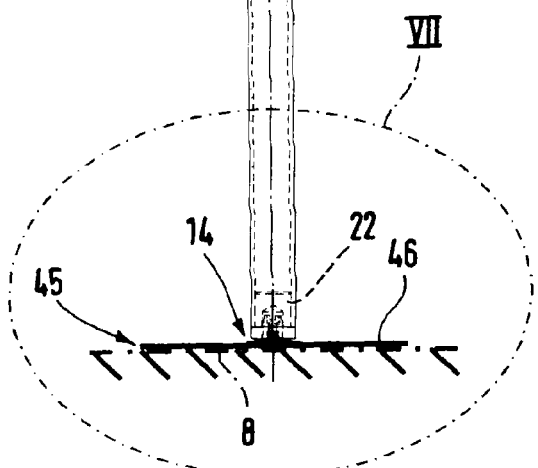
Figure 3:
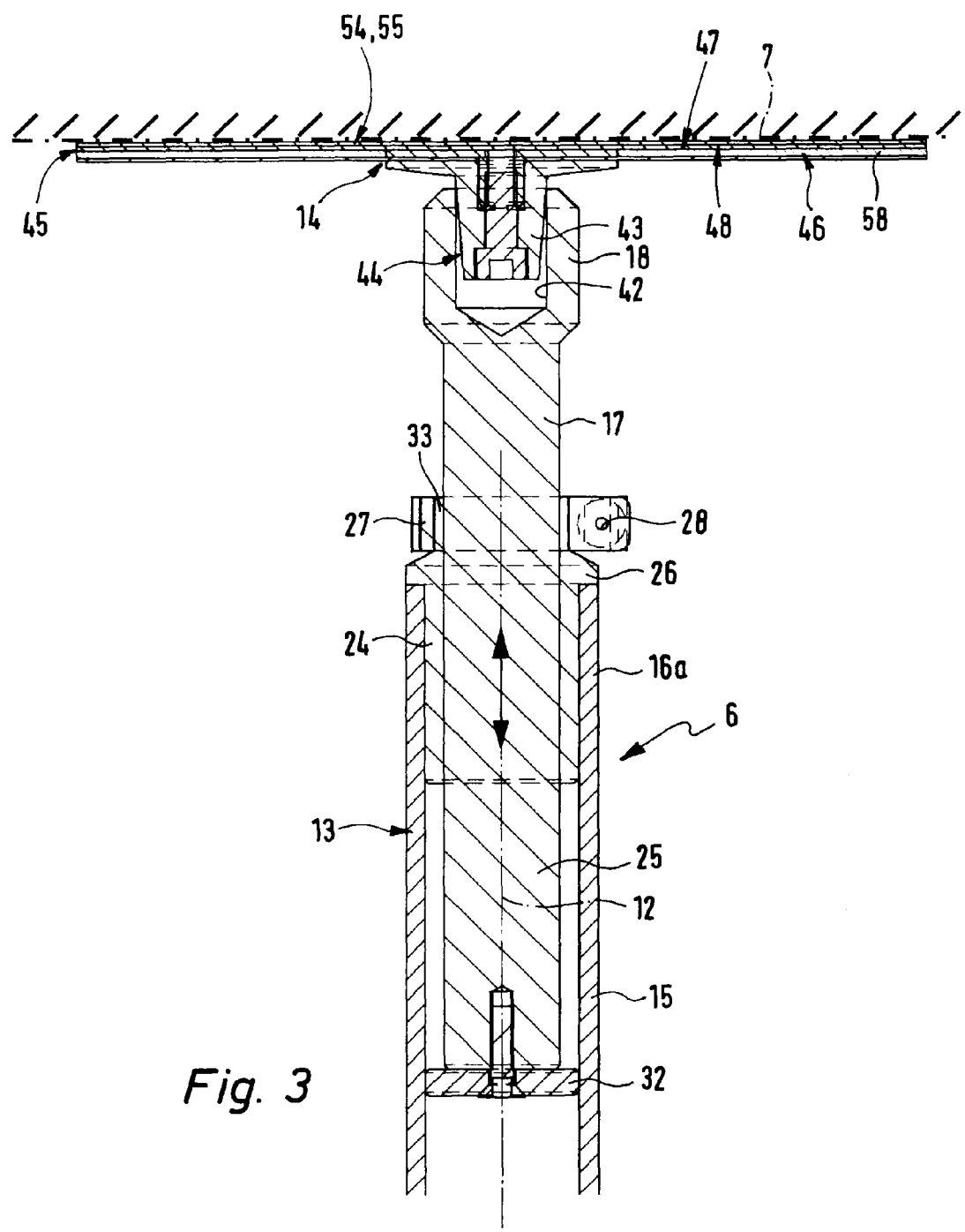
Figure 6:
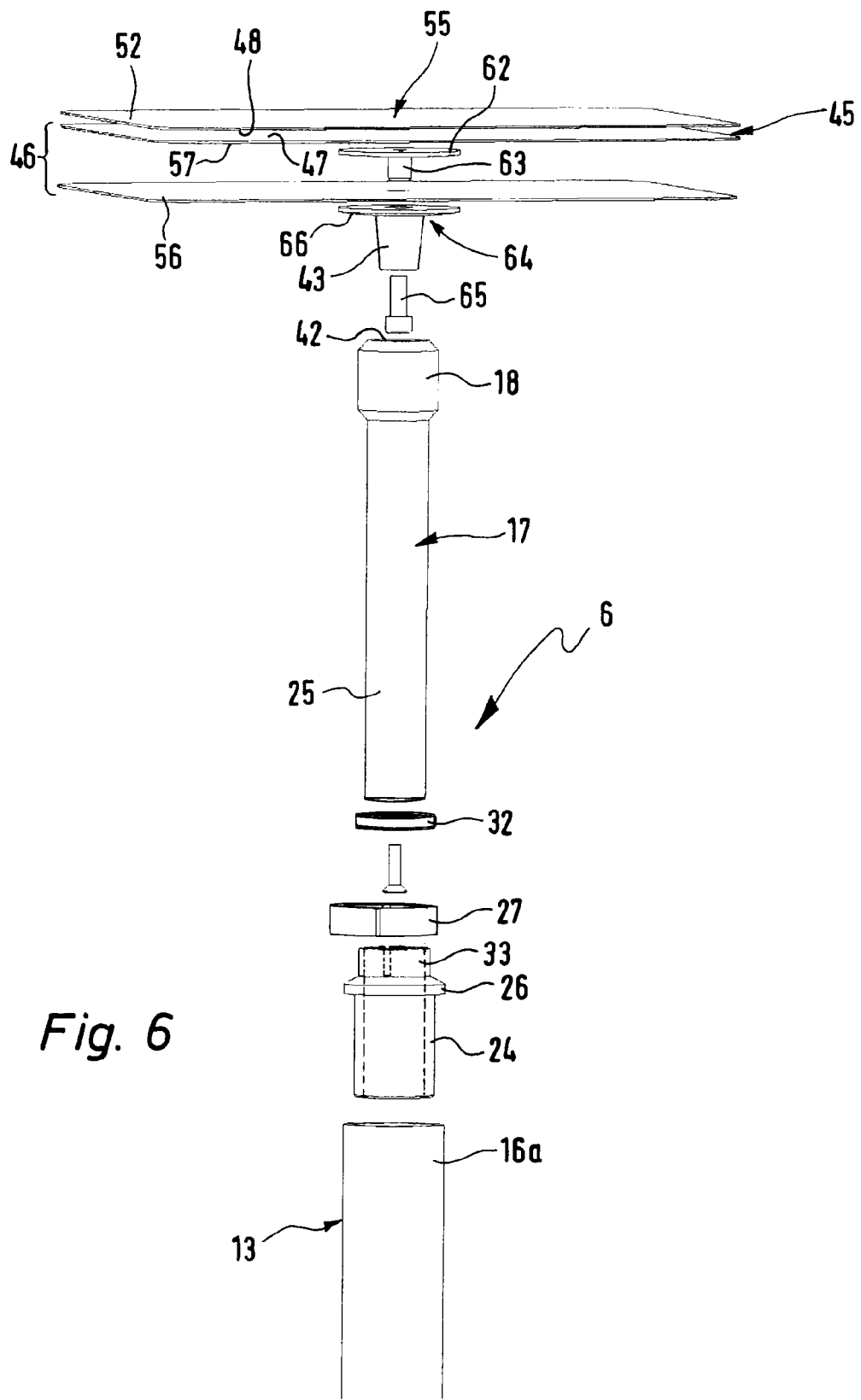

FIG. 1 shows a storage system 2 installed in a vehicle interior 1, in particular in a cargo compartment of a motor vehicle, for objects to be transported, one of which has been indicated by way of example at 3. In the embodiment represented by way of example, the storage system 2 has a plurality of deposit elements 4, for example compartmented shelves, tubs or perforated sheet metal shelves, which are arranged on top of each other and extend horizontally. The retaining device 5 is comprised of at least one, and by way of example two, retaining struts 6, which have been installed in such a way that they extend between two vehicle walls 7, 8, which are located opposite each other, and bridge the free space existing inbetween.

The retaining struts 6 are preferably mounted in a vertical orientation, in which case their longitudinal axes 12 extend in the vertical direction. Here, they can extend between a first vehicle wall 7 constituted by the vehicle floor and a second vehicle wall 8 constituted by the vehicle ceiling. However, an installation in a different orientation is also conceivable, for example with a horizontal extension between two vehicle side walls.

Corresponding to the finishing stage of the storage system 2, the retaining device can easily have a still greater number of retaining struts 6 which, application-specifically, can also be installed with different orientations between them.

Each retaining strut 6 has a longitudinally adjustable rod structure 13 extending in the direction of the longitudinal axis 12 and two plate-shaped support members 14 arranged at the facing front sides of this rod structure 13. Each retaining strut 6 is supported over a large surface on the associated vehicle wall 7, 8 via its two support members 14.

The retaining struts 6 can be releasably mounted in the vehicle interior 1, so that they can be removed again in case they are not needed, without detrimentally affecting the vehicle walls 7, 8. Since the two retaining struts 6 are identically constructed, their further description can orient itself on one of these retaining struts 6 by making reference to FIGS. 2 to 9. It should also be mentioned that the deposit elements 4 can be fixed in place on the respective rod structure 13, in particular with the participation of clamping fastening elements 15, which can be releasably clamped at variable heights on the exterior circumference of the rod structure 13.

The retaining device 5 can of course only have one retaining strut 6. The number is primarily a function of the respective intended purpose.

For matching the distance available between the two vehicle walls 7, 8, the length of the rod structure 13 can be adjusted. In the exemplary embodiment it is designed to have several sections in the axial direction for this purpose and contains a preferably pipe-shaped main rod 15, as well as a length-adaptation element 17, which engages the former coaxially at a first end section 16a and can be adjusted in the longitudinal direction of the main rod 15. The length-adaptation element 17 is embodied to be rod-shaped and, on its end projecting from the main rod 15, it has a receiving head 18 for coupling with one of the support members 14.

Figure 7:
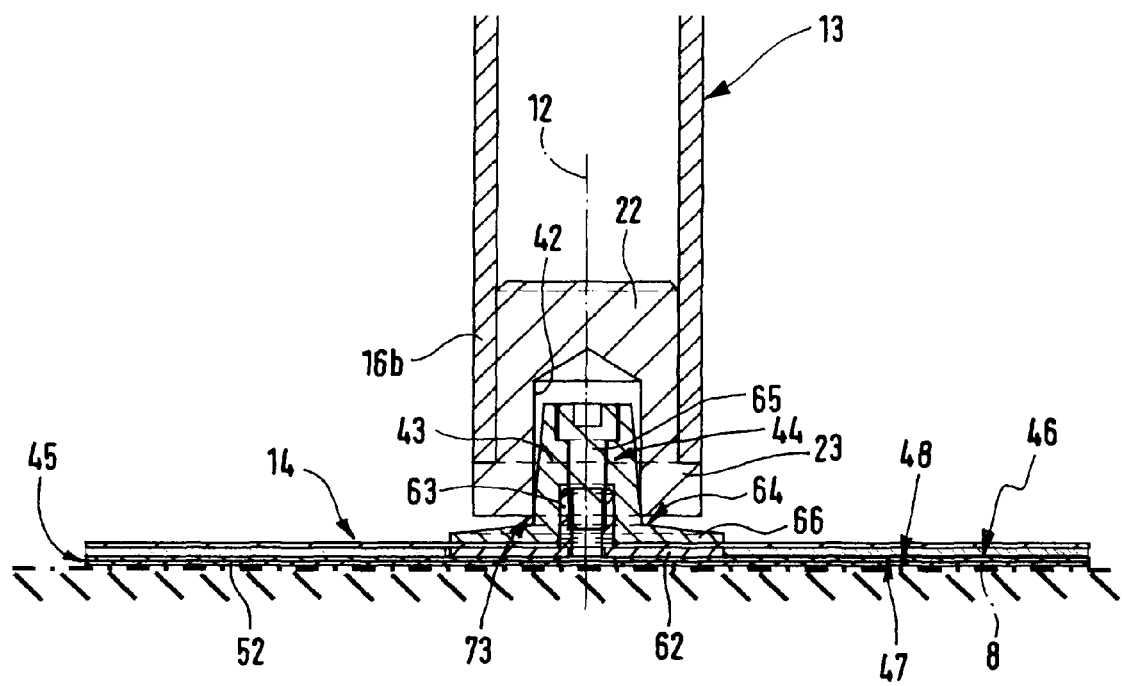

A receiving element 22, used for coupling with the other, second support member 14, is arranged at the opposite, second end section 16b of the main rod 15 (FIG. 7). In the example, although the receiving element engages the main rod 15 coaxially, it is axially immovably supported on the second end section 16b. For this purpose, it projects with a ring-shaped contact collar 23 in front of the front face of the second end section 16b.

In the exemplary embodiment, the receiving element 22 has been loosely inserted and can therefore easily be exchanged. However, a screw connection or other type of fastening would also be conceivable.

With an adjustment section 25 adjoining the receiving head 18, the length-adaptation element 17 passes through a guide sleeve 24, which has been inserted into the first end section 16a and is axially immovably supported in respect to the main rod 15. The insertion depth is limited by a contact collar 26, which rests against the front face of the first end section 16a.

In the exemplary embodiment of FIGS. 2 to 7, the length-adaptation element 17 is embodied in the form of a displacement element which, by means of its adjustment section 25, is displaceably guided in the guide sleeve 24 in the direction of the longitudinal axis 12. Depending on the relative position, it projects more or less far out of the main rod 15. It is accordingly possible to vary, in particular in a continuously adjustable manner, the length of the rod structure 13 measured between the receiving head 18 and the receiving element 22. A telescoping mechanism exists here for all practical purposes.

The desired length is fixed by a clamping clip 27, functioning as a quick-clamping arrangement, which extends around the length-adaptation element 17 outside of the main rod 15 at the adjustment section 25 and which, by means of a clamping mechanism, can be manually clamped in place on the adjustment section 25. The clamping clip 27 extends around a slit collar 33 of the guide sleeve 24 and clamps the latter against the smooth exterior surface of the adjustment section 25, and in this way fixes the desired length of the rod structure 13.

For shortening the main rod 15, the length-adaptation element 17 can be pushed in further by means of a brief release of the clamping clip 27, or it can be pulled out further for lengthening the main rod 15.

A radially protruding guide disk 32, located in the main rod 15, can be arranged on the front of the adjustment section 25 and cooperates with the inner surface of the pipe-shaped main rod 15 in order to transversely support the length-adaptation element 17 and to guide it supplementarily to the guide sleeve 24. Possible play, which might exist between the first end section 16a and the guide sleeve 24 inserted therein, is also compensated by this.

The guide disk 32 also constitutes a stop element, which prevents an unintentional, too extensive pulling of the length-adaptation element 17 out of the main rod 15. In that case the guide disk 32 then runs up onto the inner front face of the inserted guide sleeve 24.

Figure 8:
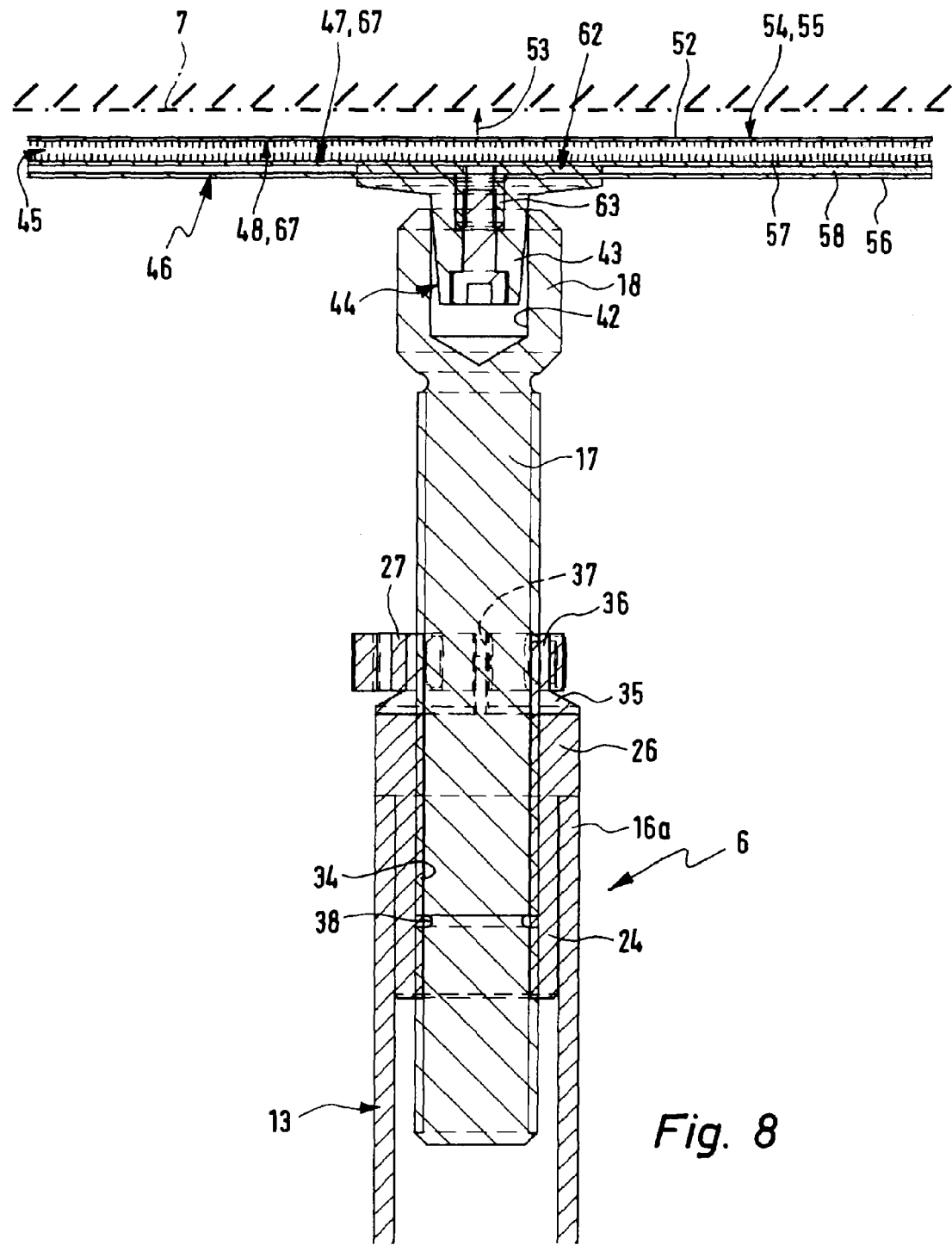
Figure 9:
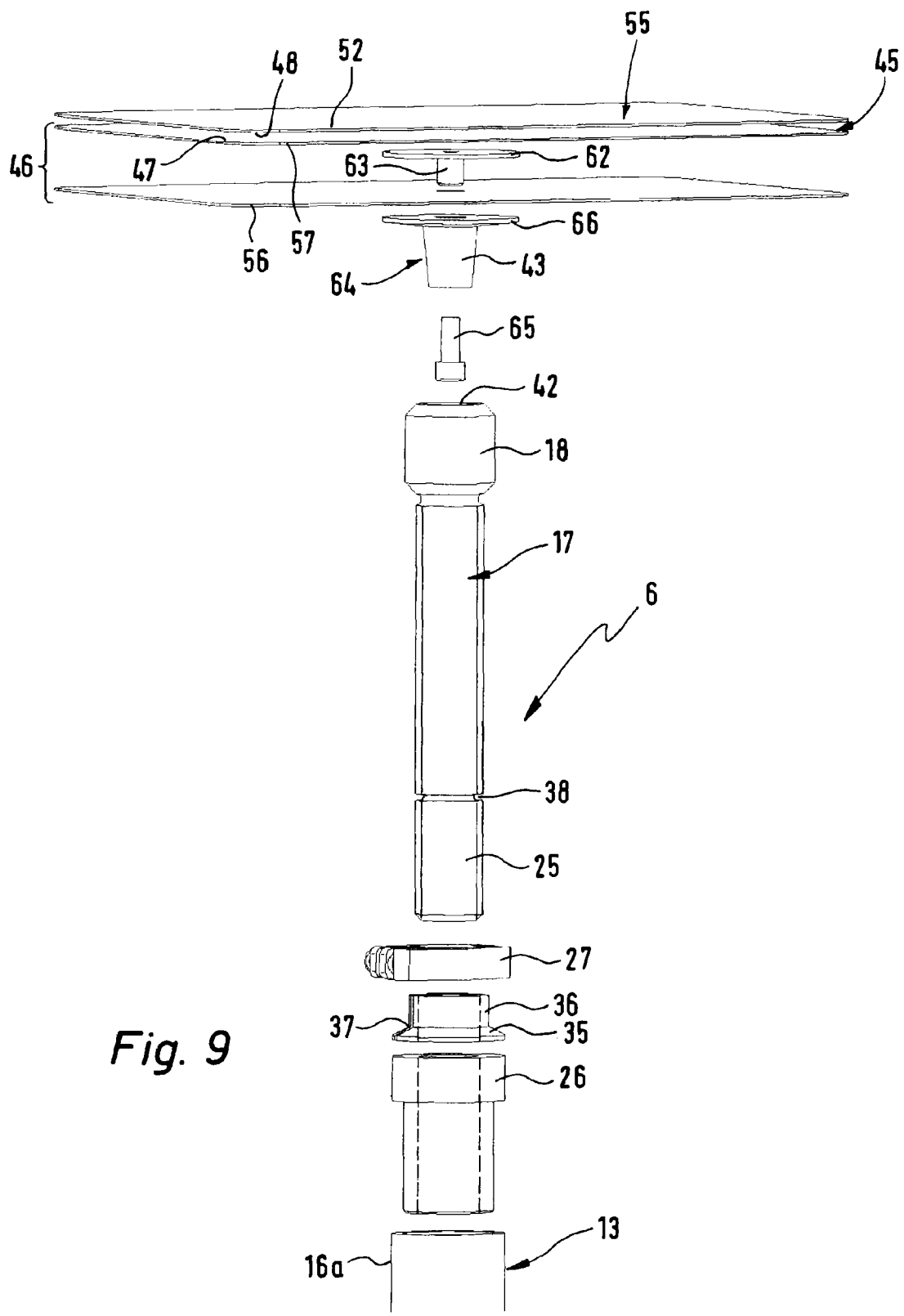

In the exemplary embodiment of FIGS. 8 and 9, the length-adaptation element 17 is embodied as a screwable element. The adjusting section 25, provided with an exterior screw thread, has been screwed into the guide sleeve 34, which is provided with an interior screw thread 34, and can be further screwed in or out for changing the rod length. The desired setting can be fixed by means of a counter-nut 35, seated on the adjusting section 25 and clamped to the outer front face of the guide sleeve 24. It is possible to again provide a clamping clip 27 for securing the position, which can be placed on a collar 36 of the counter-nut 35 provided with a longitudinal slit 37 extending through it, and can releasably clamp the counter-nut together with the exterior screw thread of the adjusting section 25.

In this type of embodiment, a mark 38 indicates the maximally permissible screwed-out axial position of the adjusting section 25. By way of example, the mark 38 is a circumferential nut introduced into the adjusting section 25.

At their fronts, the receiving head 18, as well as the receiving element 22, are provided with an axially extending plug-in receptacle 42, which is a component of a mechanical interface arrangement 44, the same as a plug-in connecting piece 43, which can be releasably axially inserted into it and is a part of the support member 14 to be coupled with the rod structure 13 at this front face. The interface arrangement 44 makes an easily releasable plug-in connection in the direction of the longitudinal axis 12 between the two support members 14 and the rod structure 13 possible.

For a releasable fastening at the respectively assigned vehicle wall 7, 8, an adhesive closure arrangement 45 is assigned to each one of the two support members 14. This makes a fixation in place of the retaining strut 6 between the two vehicle walls 7, 8 possible, without requiring the clamping of the retaining strut 6 with the two vehicle walls.

The two, preferably identically embodied, support members 14 contain a fastening plate 46 of a considerably larger cross section than the rod structure 13, whose plate level extends substantially at right angles in respect to the longitudinal axis 12 when the support member 14 is coupled with the rod structure 13. The plug-in connecting piece 43 is fixed in place on the fastening plate 46 and projects away from the front of the latter. At its opposite, also large-surfaced, front, the fastening plate 46 is provided with a first adhesive closure face 47, which usefully extends over the entire base surface of the fastening plate 46. A second adhesive closure face 48, embodied for an adhesive action together with it, is located at the front of an adhesive closure mat 52, which is embodied to be separate from the support member 14 and flexible and is designed in such a way that, in accordance with the arrow 53, with its oppositely located back 54 in front, it can be fixed in place on the associated vehicle wall 7.

This fixation in place can be easily performed if the adhesive closure mat 52 is provided with a self-adhesive layer 55 on its back 54, which adheres easily and thoroughly to the wall surface of the vehicle wall 7, 8.

The fastening plate 46 is preferably constructed of several layers and has a rear support layer 56 and an adhesive layer 57, arranged on its front and defining the first adhesive closure face 47. By means of an adhesive layer 58, not represented in FIGS. 6 and 9, these two layers 56, 57 are glued together into a unit which constitutes the fastening plate 46.

For fixing the plug-in connecting piece 43 in place, a support plate 62 made of a rigid material is embedded at a central location between the support layer 56 and the adhesive layer 57, from which a fastening bracket 63 projects radially centered and passes through the support layer 56. A coupling element 64 containing the plug-in connecting piece 43 has been placed on it from the outside and is screwed together with the fastening bracket 63 by means of a coaxial screw 65 applied from the front. Here, the support layer 56 is clamped between the support plate 62 and the base of the coupling element 64, where this base is for practical purposes embodied as a disk-shaped section 66, whose diameter can correspond to that of the support plate 62.

Advantageously, the support plate 62, as well as the disk-shaped section 66, have a circular contour which, however, is considerably smaller than that of the fastening plate 46. In particular, it is only slightly greater than the cross section of the rod structure 13.

Although in principle the fastening plate 46 could also be designed to be rigid, it is considered to be particularly advantageous if it has flexible bending properties. Here, the support layer 56 can in particular consist of a plastic foil, or of a material from which protective tarpaulins are customarily made. An embodiment has proven itself to be best, in which, although the fastening plate 46 is dimensionally stable, it can be bent back with little effort, as illustrated in FIG. 5.

In the central area of the fastening plate 46, the support plate 62 can contribute to a reinforcement of the structure, in particular for introducing transverse forces introduced from the rod structure 13 into the plug-in connecting piece 43 into the fastening plate 46 over a large area and without the formation of folds.

It should be pointed out here that the first adhesive closure face 47 usefully extends over the entire fastening plate 46, i.e. also in the area of the support plate 62.

For mounting a retaining strut 6 in the interior 1 of the vehicle, the following procedure has shown itself to be particularly advantageous, although other manipulation sequences would be possible.

Initially, the adhesive closure mats 52 are glued to the two vehicle walls 7, 8 in the area of the intended application points of the retaining strut 6. In this case their size is usefully selected to be such that the contour essentially corresponds to that of the fastening plate 46. In place of one relatively large adhesive closure mat 52 it is also possible to use respectively several smaller adhesive closure mats 52a, such as is indicated by dash-dotted lines in FIG. 1. As a rule, gluing to the vehicle wall 7, 8 becomes simpler because of this.

Next, in accordance with FIG. 7 the one support member 14 is placed against the lower adhesive closure mat 52, so that the adhesive closure faces 47, 48 are brought into adhesive contact with each other. Here, the rod structure 13 has usefully not yet been coupled with the lower support member 14.

Next, the rod structure 13, whose length has been reduced by retracting the length-adaptation element 17, is placed, together with the receiving element 22, on the upwardly projecting plug-in connecting piece 43 of the already fastened lower support member 14. This is possible without problems, because this is a plug-in connection which is loose in the axial direction.

At this time the upper support member 14 can already be introduced into the receiving head 18, so that its upward pointing first adhesive closure face 47 is located at a distance opposite the second adhesive closure face 48 of the adhesive closure mat 52 glued to the second vehicle wall 8.

By pulling the length-adaptation element 17 out of the main rod 15, it is now possible to match the length of the rod structure 13 to the distance between the two vehicle walls 7, 8, wherein simultaneously the upper support member 14 comes into adhesive connection with the upper adhesive closure mat 52. When this position has been reached, it is fixed in place, or respectively secured, by means of a clamping clip 27 and/or a counter-nut 35.

It is of course possible to mount the upper support member 14 independently of the rod structure 13 on the second vehicle wall and to make the coupling connection of the upper interface arrangement 44 only by a subsequent extension of the rod structure 13.

For making and maintaining the adhesive connections between the adhesive closure faces 47, 48 cooperating with each other, it is of advantage that no special force has to be exerted, which could possibly lead to damage to the structure of the vehicle walls 7, 8. It suffices to slightly press the fastening plate 46 against the adhesive closure mat 52.

In this connection it is particularly advantageous if the adhesive closure device 45 in accordance with the exemplary embodiment is designed in the form of a so-called hook-and-loop closure arrangement. Here, the adhesive closure faces 47, 48 which cooperate with each other are provided with adhesive structures 57, which can be releasably hooked together with each other. Suitable hook-and-loop closure arrangements of almost any arbitrary dimensions are available in the market place and can be cut to the desired dimensions without problems.

For example, hook and fleece structures, mushroom and velour structures, mushroom and fleece structures, or mushroom structures on both sides, can be selected as the adhesive structures 67 cooperating with each other.

In contrast to an adhesively operating adhesive closure arrangement, a hook-and-loop closure arrangement has the advantage that it is less likely to become dirty and remains fully functionally capable, even after repeated use.

The above mentioned flexible bending property of the fastening plate 46 has the advantage, seen in FIG. 5, that the fastening plate 46 can be easily released again from the second adhesive closure face 48, which remains in place, because in accordance with the arrow 68 it can be bent over without problems in order to be then pulled off by further pulling.

The disassembly of a support member 14 usefully takes place after the rod structure 13 has first been removed.

If a retaining strut 6 is not used for only a short time, the rod structure 13 can also be removed individually by axially pushing its components together, while the two support members 14 remain in place.

If a support member 14 is removed again, the second adhesive closure face 48 remaining in the vehicle can be covered when needed by a plate-shaped cover element and protected against soiling. For fixation in place on the second adhesive closure face 48, the cover element then can also have an adhesive closure face comparable with the first adhesive closure face 47 of the support member 14.

The axial support forces are transmitted between the support members 14 and the rod structure 13 through the respective interaction between a plug-in connecting piece 43 and a plug-in receptacle 42. It is of advantage here if the plug-in connecting piece 43 has a conical exterior face 72 tapering away from the fastening plate 46 toward the free end, and the associated plug-in receptacle 42 is shaped in such a way that, in the state in which the two elements are pushed together, only a contact area 73 in the shape of a circular line is formed coaxially in relation to the plug-in receptacle 42.

This is achieved in connection with the exemplary embodiment by means of a plug-in receptacle 42 formed as a circular cylinder, whose diameter is slightly less than that of the conical plug-in connecting piece 43 in its base area 74 directly adjoining the disk-shaped section 66.

In this way the plug-in connecting piece 43 can dip into the plug-in receptacle 42 over almost its entire length, and the contact area 73 is formed at the mouth of the plug-in receptacle 42 which comes to lie in the base area 74.

The desired axial bracing is assured by this measure, for one, and furthermore the contact area 73 is simultaneously moved axially very closely to the fastening plate 46. The contact area 73 is that area in which the transverse forces, which act on the rod structure 13 when the retaining strut 6 is in use, are introduced into the support member 14. Because of the short distance to the fastening plate 46, the introduced transverse forces act more or less only as a pushing force oriented parallel to the plate level, which attempt to displace the adhesive closure faces 47, 48, which are in engagement with each other, against each other. However, this is not possible because of the adhesive action, so that the structure remains stable. It is in particular avoided that bending moments, which by themselves could cause the release from the adhesive closure mat 52 indicated in FIG. 5, act on the fastening plate 46.

Incidentally, the acting together of the conical plug-in connecting piece 43 with the cylindrical plug-in receptacle 42 also causes an advantageous centering effect with coupling free of play. Furthermore, a hinge location is defined by the contact area 73 which, in accordance with the two-headed arrow 75, makes it possible for the support member 14 to easily tilt in any direction in relation to the rod structure 13. Because of this, the fastening plate 46 can be slightly tilted in respect to the longitudinal axis 12, which permits an automatic adaptation in case of an orientation which is not exactly right-angled.

The intended mutual close contact of opposite areas of the two adhesive closure faces 47, 48 is therefore assured here by the flexibility of the fastening plate 46, as well as because of the possible angle changes in accordance with the two-headed arrow 75.

Differing from the exemplary embodiment, the adhesive closure mat could also consist of a stiff material, if the inner surfaces of the vehicle walls intended for their application are constituted to be flat and no deformation of the adhesive closure mat is required for attachment to the vehicle wall.

It is possible in connection with all exemplary embodiments to apply the adhesive closure faces 47, 48 as a coating on a support layer.

If the mechanical interface arrangements 44 assigned to the same retaining strut 6 are identically embodied, the individual support members 14 can be selectively attached to one or the other front face of the rod structure 13, so that a very modular construction results.

While in the exemplary embodiment the two support members 14 of each retaining strut 6 are identically designed, a possibility does exist for attaching two support members 14 to a rod structure 13, whose fastening plates 46 differ from each other in the size of their surfaces and/or in their contours. It is also possible to employ differently designed adhesive closure devices 45 for the fixing in place of the two support members 14 of a retaining strut 6.

The invention claimed is:

1. A retaining device for vehicle interiors as a component of a storage system for objects to be carried in a vehicle, having at least one retaining strut, which has a longitudinally adjustable rod structure and two plate-shaped support members arranged at two oppositely located front ends of the rod structure, and which can be releasably mounted in a vehicle interior in such a way that it extends between two oppositely located vehicle walls and, by means of its two support members, the retaining strut is supported flush on these vehicle walls, wherein at least one of said plate-shaped support members comprises an adhesive closure device, having adhesive closure faces, which can be releasably connected with each other for a releasable fastening on a respectively assigned vehicle wall, and wherein the adhesive closure device comprises a fastening plate disposed at one end of the rod structure, the fastening plate having a front face facing away from the rod structure, and wherein the adhesive closure faces comprise a first adhesive closure face and a second adhesive closure face, the first adhesive closure face being arranged on the front face of the fastening plate and the second adhesive closure face being attachable to a wall of a vehicle and being releasably connected with the first adhesive closure face, and wherein the fastening plate has flexible bending properties, in such a way that, by bending and pulling, the fastening plate having the first adhesive closure face can be pulled off the second adhesive closure face for releasing an adhesive connection existing between the first and second adhesive closure faces.

2. A retaining device for vehicle interiors as a component of a storage system for objects to be carried in a vehicle, having at least one retaining strut, which has a longitudinally adjustable rod structure and two plate-shaped support members arranged at two oppositely located front ends of the rod structure, and which can be releasably mounted in a vehicle interior in such a way that the retaining strut extends between two oppositely located vehicle walls and, by means of its two support members, the retaining strut is supported flush on these vehicle walls, wherein at least one of said support members comprises an adhesive closure device having adhesive closure faces, which can be releasably connected with each other for releasable fastening on a respectively assigned vehicle wall, and wherein a mechanical interface arrangement for releasable mechanical coupling with the rod structure is assigned to one or both of said support members on the retaining strut, and wherein the mechanical interface arrangement has a plug-in connecting piece arranged on one or both of said support members, and a plug-in receptacle, arranged on a front of the rod structure, for receiving the plug-in connecting piece, and wherein the plug-in connecting piece has a conical exterior face tapering in a direction towards a free end of the connecting piece, and the plug-in receptacle is shaped in such a way that a contact area in the shape of a circular line is formed coaxially in relation to the plug-in receptacle between the plug-in receptacle and the plug-in connecting piece when plugged into it.

3. The retaining device in accordance with claim 2, wherein the adhesive closure faces comprise a first adhesive closure face and a second adhesive closure face, the first adhesive closure face facing away from the rod structure and the second adhesive closure face being attachable to a vehicle wall and being releasably connected to the first adhesive closure face.

4. The retaining device in accordance with claim 3, wherein the second adhesive closure face is a component of at least one adhesive closure mat embodied for releasable fastening on a vehicle wall.

5. The retaining device in accordance with claim 4, wherein the adhesive closure mat is embodied to be flexibly bendable.

6. The retaining device in accordance with claim 4 wherein, on its back opposite the second adhesive closure face, the adhesive closure mat is provided with a self-adhesive layer, which makes gluing it to a vehicle wall possible.

7. The retaining device in accordance with claim 3, wherein the plate-shaped support member having the first adhesive closure face has a fastening plate, on whose front facing away from the rod structure the first adhesive closure face is arranged.

8. The retaining device in accordance with claim 7, wherein the fastening plate has flexible bending properties, in such a way that, by bending and pulling, the fastening plate having the first adhesive closure face can be pulled off the second adhesive closure face for releasing an adhesive connection existing between the first and second adhesive closure faces.

9. The retaining device in accordance with claim 7 wherein, the fastening plate is provided with a rigid support plate having a smaller contour than the fastening plate.

10. The retaining device in accordance with claim 9, wherein the support plate is embedded in the fastening plate.

11. The retaining device in accordance with claim 9 wherein the first adhesive closure face extends across the support plate.

12. The retaining device in accordance with claim 1, wherein a mechanical interface arrangement for releasable mechanical coupling with the rod structure is assigned to one or both of said support members on the retaining strut.

13. The retaining device in accordance with claim 12, wherein the mechanical interface arrangement is embodied for making possible a plug-in connection, taking place in an axial direction, of the rod structure between one or both of said support members and the rod structure.

14. The retaining device in accordance with claim 12, wherein the mechanical interface arrangement has a plug-in connecting piece arranged on one or both of said support members, and a plug-in receptacle, arranged on a front of the rod structure, for the plug-in connecting piece.

15. The retaining device in accordance with claim 1, wherein the adhesive closure device is embodied in the form of a hook-and-loop closure arrangement, whose adhesive closure faces have adhesive structures, which can be releasably hooked together.

16. The retaining device in accordance with claim 2, wherein the plug-in receptacle is designed in such a way that the contact area is located at a mouth of the plug-in receptacle.

17. The retaining device in accordance with claim 2, wherein the plug-in receptacle is designed in such a way that the contact area is arranged on a base area of the plug-in connecting piece.

18. The retaining device in accordance with claim 2, wherein the plug-in receptacle has a cylindrical shape with a diameter which is larger than a smallest diameter of the conical exterior face and simultaneously smaller than a largest diameter of the conical exterior face.

19. The retaining device in accordance with claim 14, wherein the plug-in receptacle is fixedly connected with a support plate provided on at least one of the support members.

20. The retaining device in accordance with claim 1, wherein the rod structure has a main rod and a length-adaptation element, which is in an axially displaceable engagement with the main rod and can be fixed in place in different axial positions relative to the main rod.

21. The retaining device in accordance with claim 20, wherein the length-adaptation element is embodied as a screw element or a displaceable element.

22. The retaining device in accordance with claim 20, further comprising a clamping clip, which can be clamped together with the length-adaptation element for a releasable fixation of a set length of the rod structure.

23. The retaining device in accordance with claim 1, further comprising a plurality of retaining struts, which are independent of each other.

\* \* \* \* \*